United States Patent [19]
Olsen

[11] Patent Number: 5,227,062
[45] Date of Patent: Jul. 13, 1993

[54] ADJUSTABLE FLOW CONTROL FOR FLUID SEPARATION SYSTEM COMPRISING RELATIVELY MOVEABLE ORIFICE PLATES

[75] Inventor: Douglas L. Olsen, Eden Prairie, Minn.

[73] Assignee: Osmonics, Inc., Minnetonka, Minn.

[21] Appl. No.: 796,667

[22] Filed: Nov. 25, 1991

[51] Int. Cl.⁵ .............................................. B01D 35/157
[52] U.S. Cl. ............................ 210/321.6; 137/625.3; 137/625.33; 210/321.84; 210/418
[58] Field of Search .................. 137/625.3, 625.33; 210/137, 143, 194, 321.65, 321.83, 321.84, 418, 109, 112, 232, 321.67, 321.6; 209/398; 220/435

[56] References Cited

U.S. PATENT DOCUMENTS

| | | | |
|---|---|---|---|
| 89,399 | 4/1869 | Gilbert | 137/625.3 |
| 431,608 | 7/1890 | Morrison | 137/625.33 |
| 1,243,122 | 10/1917 | Winters | 137/625.33 |
| 2,601,231 | 6/1952 | Smith et al. | 137/625.33 |
| 3,716,141 | 2/1973 | Spatz | 210/194 |
| 4,086,166 | 4/1978 | Martin | 210/321.65 |
| 4,741,823 | 5/1988 | Olsen et al. | 210/137 |
| 4,781,830 | 11/1988 | Olsen | 210/321.83 |
| 4,839,037 | 6/1989 | Bertelsen et al. | 210/321.83 |
| 4,846,970 | 7/1989 | Bertelsen et al. | 210/321.84 |
| 5,160,616 | 11/1992 | Blake-Coleman | 210/321.84 |

FOREIGN PATENT DOCUMENTS

1553197  3/1990  U.S.S.R. ............................. 209/398

Primary Examiner—Joseph W. Drodge
Attorney, Agent, or Firm—Dorsey & Whitney

[57] ABSTRACT

A flow control device for use in connection with a fluid separation system of the type having a pressure feed, a fluid separation portion and a flow control passage in which the flow control device includes a fixed orifice plate with one or more orifices, a movable orifice plate with one or more orifices which are adjustably and selectively movable for alignment with the orifices in the fixed plate. The flow control device also includes a mechanism for providing adjustment movement of the movable orifice. A further aspect of the present invention is the incorporation of the flow control mechanism into a fluid separation system.

24 Claims, 4 Drawing Sheets

ADJUSTABLE FLOW CONTROL FOR FLUID SEPARATION SYSTEM COMPRISING RELATIVELY MOVEABLE ORIFICE PLATES

BACKGROUND OF THE INVENTION

1. Field of the Invention

The present invention relates generally to a flow control for a fluid separation system, and more particularly, to an adjustable flow control device, and preferably an externally adjustable flow control device, having particular applicability to a crossflow membrane separation system.

2. Description of the Prior Art

A fluid separation system of the type to which the present invention has particular applicability is a system which separates a feed solution into a concentrate or unfiltered stream and a permeate or filtered stream. Such a system typically includes a filter means such as a fluid separation membrane, a pump for pressurizing the feed solution, a concentrate stream facilitating flow of concentrate from the upstream side of the filter and a permeate stream facilitating removal of permeate from the downstream side of the filter. A valve or other restriction is commonly positioned within the concentrate stream to control the flow of concentrate from the system, and thus also the pressure of feed solution on the upstream side of the filter. Such a valve or restriction device may also be employed to control the flow of a portion of such concentrate, which is separated from the main concentrate stream and routed back or recycled upstream of the filter for combination with the feed stream. A crossflow separation system to which the present invention has particular applicability includes a crossflow membrane module such as a reverse osmosis module or the like, having a crossflow membrane across which pressurized feed solution is caused to flow.

There are several types of valves or restrictions which have been previously used in fluid separation systems for controlling flow of concentrate and/or recycle within the system. One such valve is a conventional needle valve positioned within the concentrate or recycle stream. A typical needle valve includes a circular valve seat through which concentrate is allowed to flow when the valve is in an open position and a conically shaped needle. The needle is adapted for movement into and out of engagement with the seat to control the flow of concentrate through the valve. In such needle valves, the seat which defines the flow orifice is positioned generally perpendicular to the axial direction of the stream. The advantage of a needle valve control is that it allows for virtually infinite control between a complete shutoff and a wide open flow. This wide range of flexibility, however, also results in its principal limitation. Because of the wide range of possible adjustments, and the extreme sensitivity of most fluid separation systems, adjustment of these needle control valves is usually handled by a skilled technician. This necessarily increases the cost of operation or, if a skilled technician is not employed, the chance of misfunction or malfunction of the system. A further limitation of a needle valve is the relative ease with which it may drift, either by vibration or the fluid flow against it, causing the precise setting required by the system to be altered.

Another practice is to simply drill a fixed orifice into a plate or other restriction positioned in the concentrate and/or recycle stream. This practice has the advantage of not requiring a skilled technician to operate the same, but has the obvious disadvantage of being relatively inflexible. Use of a fixed orifice has the further disadvantage in that the size of the orifice is seldom, if ever, right the first time for a particular system because of variables in the components and the accuracy of the orifice itself. This requires resizing of the orifice and/or the addition or closing of orifice holes and often requires multiple attempts to attain the proper flow rates and pressure. Additionally, if changes are needed in the field, a similar process must be repeated. A further disadvantage of a fixed orifice is the need for a separate flush valve to flush the system, when desired.

A further flow control mechanism for a fluid separation system involves a design which incorporates both a needle valve concept and a fixed orifice concept as shown in U.S. Pat. No. 3,716,141. This structure eliminates the need for a separate flush valve while also eliminating the need for adjustment by a skilled technician. Such structure, however, still has the disadvantages of a fixed orifice in that it does not permit adjustment of the orifice after installation, except by resizing the orifice, the addition or closing of orifice holes or the replacement of the orifice component.

Accordingly, there is a need for an improved flow control device for a fluid separation system and more specifically to an adjustable flow control mechanism for a fluid separation system which overcomes the limitations of the prior art.

SUMMARY OF THE INVENTION

In contrast to the prior art, the present invention relates to a flow control for a fluid separation system, and more particularly, to an adjustable valve or orifice for controlling the flow of concentrate from, and the operating pressure within, such system and/or the recycle of concentrate to the feed stream. Although the mechanism of the present invention is generally adaptable to any fluid separation system requiring an operating pressure and having a concentrate stream, it has particular adaptability to a crossflow separation system which include a crossflow membrane module and a pump for pressurizing the feed solution. In contrast to the prior art, the present invention provides advantages of the fixed orifice concept, while also providing flexibility of adjustment, if desired or necessary. Thus, it is more user friendly.

The adjustable flow control means of the present invention includes an adjustable orifice which allows flow of fluid through the orifice in a direction generally parallel to the flow direction of the concentrate stream at the point of control. The control means includes a fixed orifice plate having at least one orifice therein and a second or movable orifice plate which is positioned adjacent the fixed orifice plate and which also includes at least one orifice. The movable orifice plate is movable relative to the fixed orifice plate to cause selective adjustment of their respective orifices relative to one another. Means are also provided for adjusting the moveable orifice plate to provide for the desired relative alignment. Preferably, the movable orifice plate is infinitely adjustable between a position in which the orifices are totally unaligned to prevent passage of fluid and a position in which the orifices are fully aligned to allow maximum passage of fluid. The adjustment is performed externally and does not require removal of the orifice or shutdown of the system.

The device of the present invention also includes guide and retaining means for guiding and retaining the moveable orifice plate relative to the fixed orifice plate during the adjusting movement.

Accordingly, it is an object of the present invention to provide a flow control mechanism for a fluid separation system which provides greater flexibility while at the same time being more user friendly then devices in the prior art.

Another object of the present invention is to provide an improved adjustable orifice for the concentrate and/or concentrate recycle streams in a fluid separation system.

A further object of the present invention is to provide an improved adjustable flow control mechanism having particular adaptability to a crossflow separation system.

A further object of the present invention is to provide a flow control mechanism for a fluid separation system which facilitates easy field changes and is quieter than prior art designs.

A further object of the present invention is to provide an adjustable flow control orifice generally parallel to the flow through such passage at the point of control.

A still further object of the present invention is to provide a remote automatically actuated adjustable flow control mechanism for a fluid separation system.

These and other objects of the present invention will become apparent with reference to the drawings, the description of the preferred embodiment and the appended claims.

DESCRIPTION OF THE PREFERRED EMBODIMENT

Figure 1:
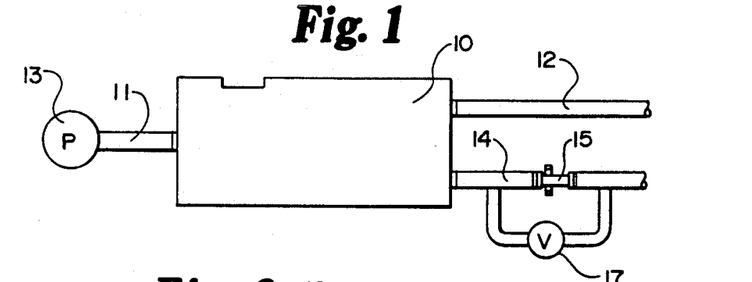
FIG. 1 is an illustration of a fluid separation system with which the flow control mechanism of the present invention is adapted for use.

Reference is first made to FIG. 1 which illustrates a fluid separation system of the type with which the flow control mechanism of the present invention is adapted for use. As indicated previously, the flow control mechanism of the present invention has applicability to a variety of fluid separation systems including stills, coalescors or the like, but has particular applicability to a crossflow separation system. The fluid separation system of the preferred embodiment as illustrated in FIG. 1 is a crossflow separation system comprising a crossflow fluid separation module 10, a feed solution inlet 11, a pump 13, a permeate or filtered stream 12 and a concentrate or unfiltered stream 14. The device of the present invention also includes a flow control mechanism 15 positioned within the concentrate stream 14 of FIG. 1 and a by pass or flush valve 17 to facilitate a flushing of the concentrate passage if and when desired.

Although not illustrated in detail in FIG. 1, the module 10 can include any common crossflow or other fluid separation module known in the art. Typical modules of the type to which the present invention is applicable utilize reverse osmosis or ultrafiltration membranes. Such membranes are commonly constructed in a spiral configuration. The module 10 is provided with a fluid separation membrane which in the preferred embodiment is a crossflow membrane.

The feed stream 11 is provided with a pump 13 for pressurizing the feed solution and supplying the same to the upstream side of a fluid separation membrane. The permeate stream 12 is connected with the module 10 to facilitate removal of that portion of the feed solution which passes through the filtering membrane, while the concentrate stream or conduit 14 is connected with the module 10 to facilitate removal of that portion of the feed solution which does not pass through the filtering membrane. The flow control mechanism 15 of the present invention is positioned within the concentrate stream 14 to facilitate the development of back pressure on the upstream side of the fluid separation membrane. This mechanism 15 accordingly controls the operating pressure within the membrane module and flow control of concentrate from the system.

Reference is next made to FIGS. 2-7 illustrating the details of the preferred embodiment of the flow control mechanism 15. The mechanism 15 includes a generally tubular member 16 having an outer cylindrical wall 18 and an inner cylindrical passage wall 19 defining a concentrate passage. Although the tubular number 16 is not limited to any particular cross-section configuration, the member 16 of the preferred embodiment is cylindrical and the cross-section configuration is a circle. A pair of recessed portios 20 and 21 are positioned near opposite ends of the tubular member 16 to facilitate connection of the mechanism 15 to portions of the concentrate conduit 14 (FIG. 1). The recessed portions 20 and 21 extend around the tubular member 16 and are adapted to receive a clamp member or other appropriate connection means.

Figures 2, 3:
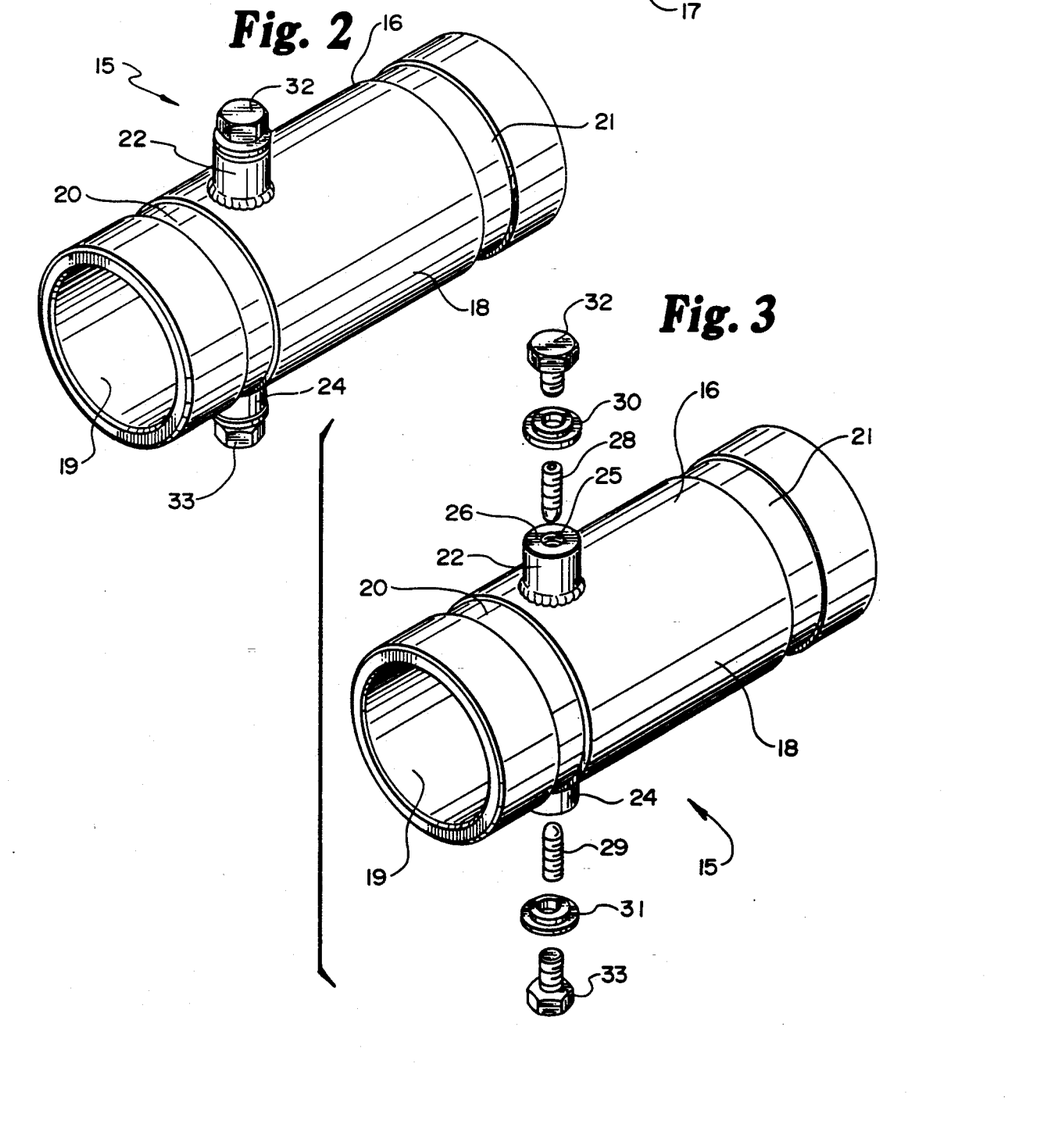
FIG. 2 is a pictorial view of the flow control mechanism of the present invention.
FIG. 3 is a pictorial view, partially broken apart, of the flow control mechanism of the present invention.
Figures 4, 5, 6, 7, 8:
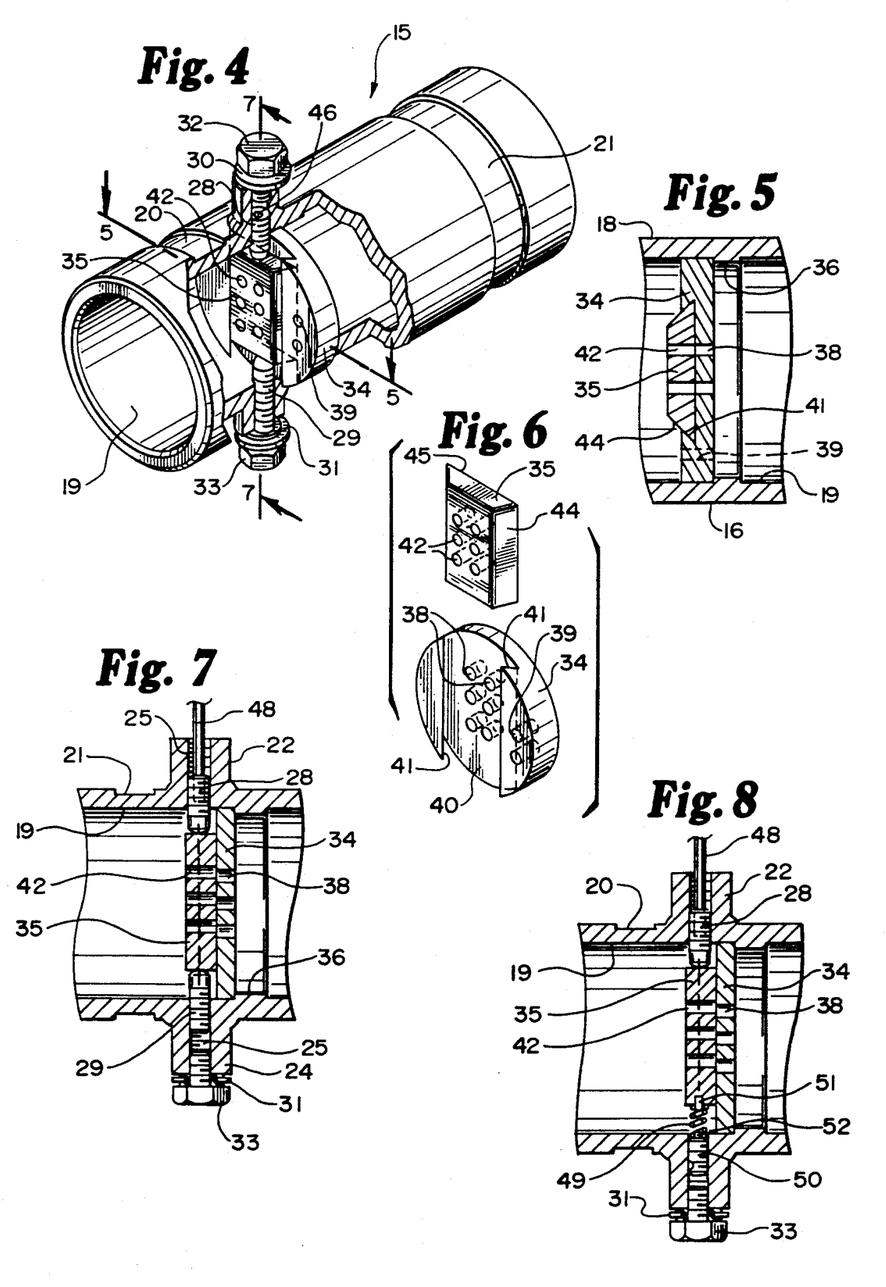
FIG. 4 is a pictorial view similar to FIG. 2 with parts broken away.
FIG. 5 is a sectional view along the section line 5—5 of FIG. 4.
FIG. 6 is a pictorial view, broken apart, of the fixed and moveable orifice plates for the flow control mechanism of the present invention.
FIG. 7 is a sectional view as viewed along the section lines 7—7 of FIG. 4.
FIG. 8 is a view similar to FIG. 7 showing an alternate structure for supporting and moving the moveable orifice plate relative to the fixed orifice plate.

In the preferred embodiment, the tubular member 16 is provided with a first or upper boss 22 and a second or lower boss 24 which are positioned on diametrically opposite sides of the member 16. Each of the bosses 22 and 24 is secured to the outer surface of the tubular member 16 by welding or the like and each extends generally radially outwardly therefrom. The bosses 22 and 24 are generally cylindrically shaped and, as illustrated best in FIGS. 3 and 7, are provided with an internally threaded opening 25 and a flat, annular shaped seat portion 26. As illustrated in FIG. 7, the internal threaded opening 25 extends through each of the bosses 22 and 24 and through the wall of the member 16 into the interior of the concentrate passage. As will be described in greater detail below, the bosses 22 and 24 are adapted to receive corresponding adjustment screws 28 and 29, seals 30 and 31 and cap screws 32 and 33.

The valve or flow control portion of the preferred embodiment of the mechanism 15 is illustrated best in FIGS. 4–7. Positioned within the interior of the tubular member 16 and in the concentrate passage is a fixed or stationary orifice plate 34 and a moveable or adjusting orifice plate 35. The fixed orifice plate 35 is retained within the interior of the tubular member 16 and on one side of the internally threaded openings 25. The preferred embodiment shows the fixed orifice plate 34 as being retained against a shoulder portion 36 extending inwardly from the inner passage wall 19. It is contemplated that the orifice plate 34 may be retained in this position either by a press fit or by welding or the like. It is also contemplated that various other means can be used to secure the fixed orifice plate 34 within the concentrate passage.

The fixed orifice plate includes a plurality of centrally positioned adjustment orifices 38 and a pair of nonadjustable or fixed, minimum flow orifices 39. The orifice plate 34 also includes a central recessed portion defining a recessed surface 40 and a pair of recessed beveled edges 41. The edges 41 are adapted to accommodate and receive corresponding beveled edges of the movable orifice plate 35 as will be described below.

In the preferred embodiment, the orifice plate 34 is a generally disk shaped element having an outer circular configuration conforming substantially to the circular interior configuration of the passage wall 19. The orifices 38 and 39 extend through the plate 34 in a generally axial direction. Thus, when the plate 34 is positioned within the member 16, the orifices 38 and 39 extend in a generally axial direction relative to the tubular configuration of the member 16.

The moveable orifice plate 35 is a generally rectangular shaped member positioned upstream of the plate 34 and includes a plurality of adjustment orifices 42 which extend through the plate 35. The plate 35 includes a generally flat, bearing surface 45 adapted for seating against the surface 40 of the plate 34. A pair of opposed, side beveled edges 44 are provided for sliding engagement with the corresponding beveled edges 41, of the fixed orifice plate 34. The orifices 42 are positioned in the plate 35 so that when the plate 35 is positioned or moved relative to the orifice plate 34, the orifices of 42 are selectively alignable with the orifices 38. As shown in FIG. 5, the orifices 42 and 38, when viewed from above, are always in alignment with one another, while, as shown in FIG. 7, when viewed from the side, the orifices 42 and 38 are adjustable relative to one another. This adjustment enables the orifices 42 and 38 to be fully aligned with one another to provide for maximum flow if desired or can be moved to a position in which the orifices 42 and 38 are completely unaligned to provide for no or minimum flow.

Thus, with the orifice plate structures described above, the orifices 42 and 38 can be moved between a fully aligned position to a completely unaligned position or any position therebetween to provide for desired adjustment of flow. To facilitate minimum flow conditions, the vertical spaces between the individual orifices 42 and the individual orifices 38 and 42 must be at least equal to the diameter of the orifices 42 and 38. The preferred embodiment shows the orifices 38 as being generally cylindrical in configuration, however, such orifices can be of any configuration.

The means for adjusting the position of the movable orifice plate 35 relative to the fixed orifice plate 34, and thus controlling the flow of fluid through the orifices 42 and 38 is illustrated best in FIGS. 4 and 7. Specifically, the adjustment means includes the adjustment screws 28 and 29 which are threadedly received by the internal threaded openings 25 in the bosses 22 and 24, respectively. Each of the adjustment screws 28 and 29 includes an inner bearing end adapted for adjusting engagement with an opposite upper and lower edge of the moveable orifice plate 35. Each of the adjustment screws 28 and 29 is also provided with an allen wrench recess 46 (FIG. 4) to receive a conventional allen wrench 48 (FIG. 7) or other similar tool. By threadedly adjusting the screws 28 and 29, the desired relative position of the plates 35 and 34 can be obtained and thus the desired amount of opening defined by the adjustment orifices 42 and 38 can be achieved. It should be noted that even when the adjustment orifices 42 and 38 are closed relative to one another, the fixed or minimum flow orifices 39 in the plate 34 permit a certain minimum flow through the mechanism. The provision of the fixed orifices 39 and the size and number of them, if any, is within the discretion of the manufacturer, depending upon the application of the mechanism.

After adjustment of the plate 35 has been completed, the seal members 30 and 31 and the cap screws 32 and 33 are installed as shown in FIGS. 4 and 7. These elements are desireable to provide a leak-proof system since the threaded relationship between the screws 28 and 29 and their corresponding openings 25 are not intended to be sealed.

The mechanism of the present invention also includes means for guiding and retaining the plates 34 and 35 relative to one another. In the preferred embodiment this means includes the corresponding pairs of beveled edges 41, 41 and 44, 44 to provide for positional adjustment of the orifice plate 35 relative to the orifice plate 34. It is contemplated, however, that other means may be provided to facilitate relative movement between plates 34 and 35 and thus the desired adjustment. Preferably, it is contemplated, that either the moveable plate 35 or the fixed plate 34 would have guide means or guide surfaces for guiding such adjusting movement.

FIG. 8 illustrates an alternate means for adjusting the position of the moveable orifice plate 35. Specifically, this alternate contemplates the provision of a coil or other compression spring 49 positioned between a modified adjustment screw 50 and the bottom bearing surface of the plate 35. Both the bottom bearing surface of plate 35 and the modified adjustment screw 29 are provided with spring alignment posts 51 and 52 to maintain alignment of the spring 49. In the embodiment of FIG. 8, the position of the plate 35 is biased upwardly by the spring 49. In this embodiment, adjustment is accomplished solely by rotation of the adjustment screw 28.

Figure 9:
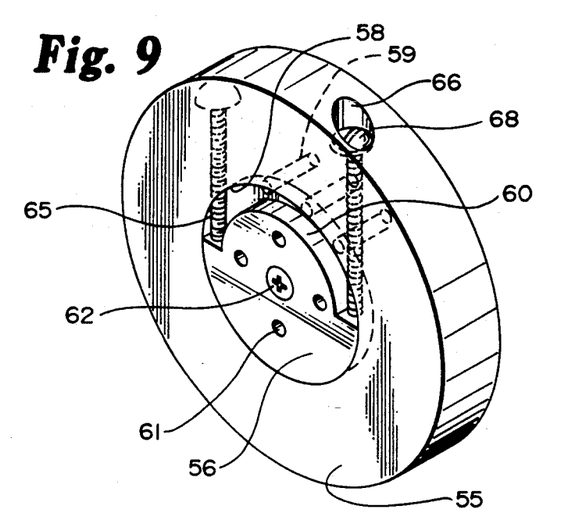
FIG. 9 is a pictorial view of an alternate embodiment of the flow control mechanism of the present invention.
Figure 10:
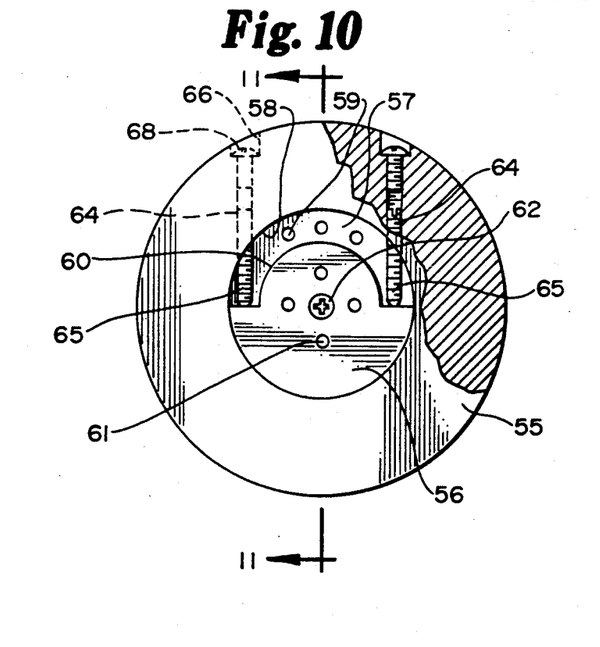
FIG. 10 is a front elevational view of the alternate embodiment of FIG. 9.
Figure 11:
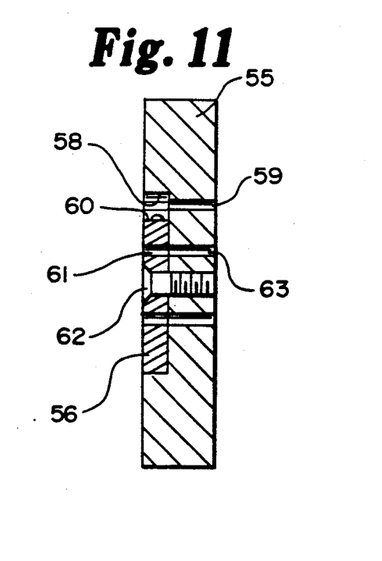
FIG. 11 is a sectional view as viewed along the section line 11—11 of FIG. 10.

An alternate embodiment of the flow control device of the present invention is illustrated in FIGS. 9, 10 and 11. As shown, the alternate configuration includes a fixed orifice plate in the form of the generally disc shaped element 55 and a movable orifice plate in the form of the insert portion 56. The fixed orifice plate 55 includes a generally circular, centrally positioned recessed portion 58 defined in part by the bearing surface 57. A plurality of fixed orifices 59 and adjustable orifices 63 (FIG. 11) extend through the plate 55 in the area of the recess 58.

The movable orifice plate 56 includes a generally circular portion having a radius approximating the radius of the recessed portion 58 and a generally circular portion of lesser diameter defined by the surface 60. The movable orifice plate 56 is rotatably secured within the recessed portion 58 of the disc 55 by the threaded pivot pin 62. As best illustrated in FIG. 11, the pin 62 extends through the plate 56 and is threadedly received by the plate 55.

The plate 56 is provided with a plurality of orifices 61 which are positioned for selective alignment with the adjustable orifices 63 of the plate 55 upon rotation of the plate 56. The fixed orifices 59 of the plate 55 are in the open area of the recessed portion 58 defined by the surface 60 to permit fluid flow therethrough regardless of the adjusted position of the plate 56.

The adjustment means is illustrated best in FIGS. 9 and 10. As shown, the plate 55 is provided with a pair of threaded openings 64, 64 for receiving a pair of adjustment screws 65, 65. These adjustment screws are accessible to an allen wrench for rotation. Each of the threaded openings also is provided with a cap screw or the like 68 which is provided with a seal gasket for sealing the openings 64. The screws 68 are disposed in insets 66. The lower ends of the adjustment screws 65, 65 engage corresponding bearing surfaces 67, 67 on the plate 56. When angular adjustment of the plate 56 is desired, one of the adjustement screws 65 is adjusted in one direction, while the other is adjusted in the opposite direction. This causes corresponding rotation of the plate 56 and relative adjusting movement of the orifices 61 relative to the orifices 63.

The alternate embodiment illustrated in FIGS. 9–11 can be constructed within a tubular configuration in the manner illustrated in the preferred embodiment or can be constructed as shown in FIGS. 9–11 in which it is contemplated that the plate 55 would be sandwiched between a pair of companion flanges with gaskets.

Figure 12:
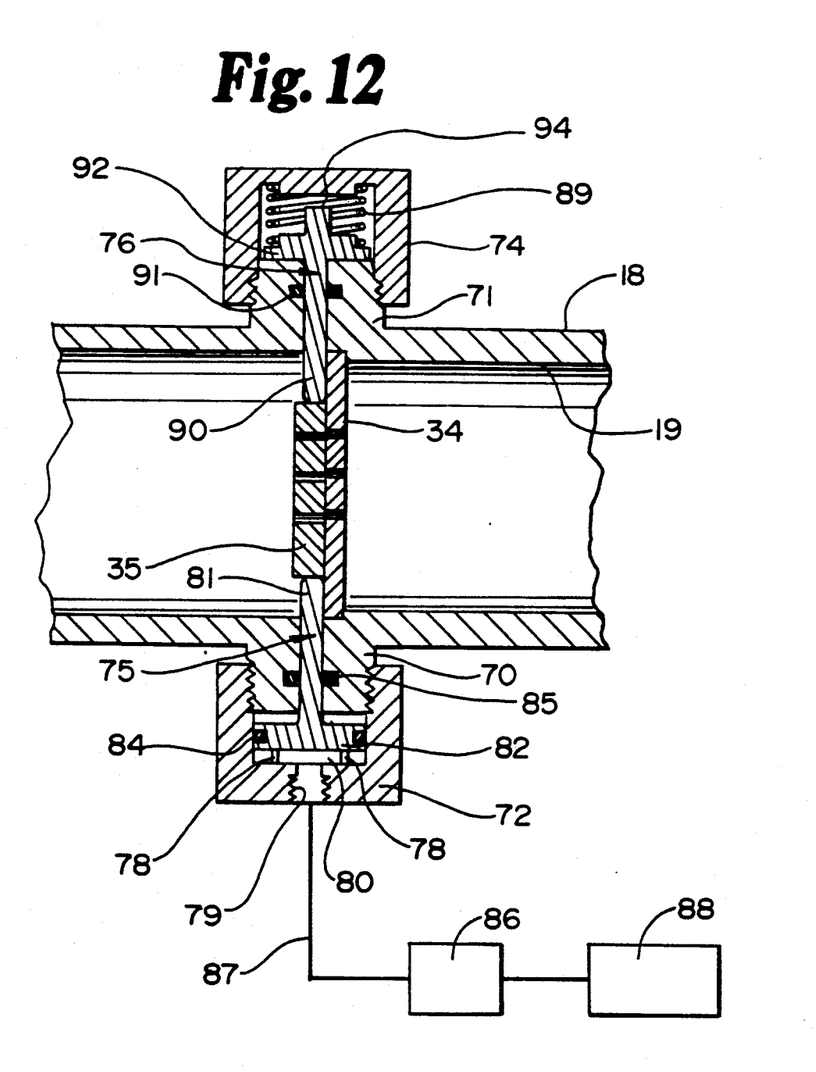
FIG. 12 is a sectional view of an automatically actuated adjustable flow control mechanism in accordance with the present invention.

The embodiments of FIGS. 2–11 include means for manual adjustment of the flow control mechanism. It is also contemplated, however, that the flow control mechanism of the present invention can be automatically and non-manually actuated by various mechanisms. One such mechanism for automatically and remotely actuating the flow control mechanism is illustrated in FIG. 12. As shown, the cylinder 18 of FIG. 12 is provided internally with adjustable orifice means such as the fixed orifice plate 34 and moveable orifice plate 35 shown in FIG. 7. Other configurations are also possible. A pair of bosses 70, 71 are integrally formed with the cylinder wall 18 on opposite sides thereof for receiving control caps 72 and 74 and control stems 75 and 76, respectively.

The boss 70 is provided with external threads to receive the internal threads of the cylinder adjusting cap 72. The cap 72 is provided with a stop member 78 for engagement by a portion of the stem 75 and a port 79 for connection with a supply of pneumatic or hydraulic pressure. The stem 75 includes an elongated portion 81 extending through the boss 70 and into the interior of the cylinder 18 for engagement with one end of the moveable orifice plate 35. The other end of the elongated portion 81 is provided with a cylinder end 82. Appropriate seal means 84 such as an O-ring seal is provided around the periphery of the portion 82 to define a pressure chamber 80 between an outer surface of the portion 82 and an interior portion of the cap 72. A seal member 85 such as an O-ring seal is also provided between the elongated stem portion 81 and the boss 70. As shown schematically in FIG. 12, the port 79 is connected via a conduit 87 to a pneumatic or hydraulic power source 86 and a remote control mechanism 88.

The boss 71 is provided with external threads to receive the spring adjusting cap 74. The cap 74 includes a seat for one end of a return spring member 89. The stem 76 is provided with an elongated portion 90 which extends through the boss 71 for engagement with an opposite end of the moveable orifice plate 35. A seal member 91 is positioned between the elongated portion 90 and the boss to provide a seal. The adjustment stem 76 also includes a spring receiving portion 92 for receiving the other end of the spring member 89. The spring member 89 functions to bias the stem 76, and thus the plate 35 and the stem 75, in a downward position (as shown in FIG. 12) against the stop members 78. The adjustment stem 76 also includes a stop member 94 which limits the movement of the stem 76 by engagement with internal surface of the cap 74.

By adjusting the position of the cylinder adjusting cap 72 as a result of rotating the same relative to the boss 70, the position of the stop 78 can be adjusted to define a first position of the orifice plate 35. This first position is the normal flow position of the mechanism resulting from the orifice plate 35 being biased by the return spring 89. A second position of the orifice plate 35 can be defined by adjustment of the spring adjusting cap 74. This second position of the plate 35 is defined by the position of the spring adjusting cap 74 relative to the stop 94. This cap 74 can be adjusted to provide a full flush in which the orifices in the plates 34, 35 are fully aligned, or a second partially closed adjustment position.

To cause the plate 35 to move from a first adjustment position to a second adjustment or flush position, the remote control means 88 is actuated, thereby causing a flow of pneumatic or hydraulic pressure from the pressure source 86 to the chamber 80. This causes the plate 35 to move until the stop 94 engages the spring adjustment cap 74. This second position is maintained as long as there is pressure in the chamber 80. When movement of the plate 35 to the first adjustment position is desired, the pressure source 86 is deactivated by the control 88 and the spring 89 causes the plate 35 to move to its first adjustment position.

Although the preferred and alternate embodiments described above have been quite specific, it is contemplated that various modifications could be made without deviating from the spirit of the present invention. Accordingly, it is intended that the scope of the present invention be dictated by the appended claims rather than by the description of the preferred and alternate embodiments.

I claim:

1. A flow control mechanism for controlling the flow of fluid in a passage within a fluid separation system having a fluid pressure feed, a fluid separation means and a passage in communication with the separation means, said mechanism comprising:
   a tubular member having a pair of open ends adapted to be insertable between sections having a tubular inner passage wall defining a flow passage extending from one to the other of said ends;
   a fixed orifice plate positioned in said flow passage;
   at least one orifice in said fixed orifice plate;

a movable orifice plate being movable relative to said fixed orifice plate in a direction generally perpendicular to said inner passage wall; and at least one orifice in said movable orifice plate which is selectively alignable with at least one orifice in said fixed orifice plate as a result of the movement of said movable orifice plate relative to said fixed orifice plate.

2. The flow control mechanism of claim 1 including adjustment means for adjustably moving said movable orifice plate.

3. The flow control mechanism of claim 2 wherein said adjustment means includes at least one adjustment member for adjusting engagement with a portion of said movable orifice plate.

4. The flow control mechanism of claim 3 wherein said adjustment means further includes a bias means for biasing said movable orifice plate toward engagement with said one adjustment member.

5. The flow control mechanism of claim 3 wherein said fixed orifice plate has its outer peripheral edge in close proximity with said passage wall and wherein said adjustment means includes a pair of adjustment members extending through diametrically opposed wall portions of said tubular member.

6. The flow control mechanism of claim 3 wherein said fixed orifice plate has its outer peripheral edge in close proximity with said passage wall and wherein said adjustment member is threadedly received by a portion of said tubular member.

7. The flow control mechanism of claim 6 including means for sealing said adjustment means.

8. The flow control mechanism of claim 1 including a plurality of orifices in said fixed orifice plate.

9. The flow control mechanism of claim 8 including a plurality of orifices in said moveable orifice plate selectively alignable with said plurablity of orifices in said fixed orifice plate.

10. The flow control mechanism of claim 9 wherein said plurality of orifices in each of said fixed and moveable orifice plates are spaced from one another a distance at least equal to the cross-sectional dimension of said orifices.

11. The flow control mechanism of claim 1 for use in connection with a cross flow fluid separation system.

12. The flow control mechanism of claim 1 wherein said at least one orifice in said fixed orifice plate is an adjustment orifice.

13. The flow control mechanism of claim 1 wherein said concentrate passage facilitates flow in a generally axial direction therethrough and said orifices in said fixed and moveable orifice plates extend in a direction generally parallel to the axial direction of said passage.

14. The flow control mechanism of claim 1 wherein said fixed orifice plate is a disk shaped member in which said at least one orifice extends therethrough in a direction generally perpendicular to said disk.

15. The flow control adjustment mechanism of claim 14 wherein said fixed orifice plate is positioned downstream of said moveable orifice plate and each of said fixed and moveable orifice plates includes mating, generally flat surfaces adapted for sliding movement relative to one another.

16. The flow control mechanism of claim 1 wherein said at least one orifice in said fixed orifice plate includes an adjustable orifice and a fixed orifice.

17. The flow control mechanism of claim 1 including guide means for guiding the relative movement between said fixed and moveable orifice plates.

18. A fluid separation system for separting a feed solution into a permeate stream and a concentrate stream and having a flow control mechanism for controlling the flow of fluid within said system comprising:

a fluid separation membrane having an upstream and a downstream side;

a pressurizing pump means for supplying pressurized feed solution to the upstream side of said separation membrane;

a concentrate stream in communication with the upstream side of said separation member;

a flow control mechanism positioned in said concentrate stream comprising;

a fixed orifice plate having at least one adjustment orifice, a movable orifice plate being movable relative to said fixed orifice plate and having at least one orifice selectively alignable with said at least one adjustment orifice in said fixed orifice plate, and means for adjustably moving said movable orifice plate.

19. The fluid separation system of claim 18 being a cross flow separation system.

20. The fluid separation system of claim 18 wherein said orifices extend in a direction generally parallel to the flow of fluid in said concentrate stream.

21. A flow control mechanism for a fluid separation system for controlling the flow of fluid in a passage within such system comprising:

a flow passage;

a fixed orifice plate positioned in said passage;

at least one orifice in said fixed orifice plate;

a movable orifice plate being movable relative to said fixed orifice plate;

at least one orifice in said movable orifice plate which is selectively alignable with said orifice in said fixed orifice plate as a result of the movement of said movable orifice plate relative to said fixed orifice plate; and guide means for guiding the relative movement between the fixed and movable orifice plates comprising corresponding beveled edges of said fixed and movable orifice plates.

22. A flow control mechanism for a fluid separation system for controlling the flow of fluid in a passage within such system comprising:

a tubular member having a pair of open ends being adapted for coupling of at least one of said ends to at least one other member, said members together defining a flow passage;

a fixed orifice plate positioned in said passage;

at least one orifice in said fixed orifice plate;

a movable orifice plate being in face-to-face registration with, and rotationally movable relative to, said fixed orifice plate; and at least one orifice in said movable orifice plate which is selectively alignable with said at least one orifice in said fixed orifice plate as a result of the movement of said movable orifice plate relative to said fixed orifice plate.

23. The flow control mechanism of claim 22 in which said fixed and movable orifice plates have generally flat opposing surfaces.

24. A fluid separation system comprising:

a fluid separation means for separating a feed solution into first and second fluid streams and having an upstream and a downstream side;

a pressurizing pump means for supplying feed solution to the upstream side of said separation means;

a flow control mechanism positioned in one of said first and second streams comprising:

a fixed orifice plate having at least one adjustment orifice, a movable orifice plate being movable relative to said fixed orifice plate and having at least one orifice selectively alignable with said at least one adjustment orifice in said fixed orifice plate, and means for adjustably moving said movable orifice plate.

* * * * *

UNITED STATES PATENT AND TRADEMARK OFFICE
CERTIFICATE OF CORRECTION

PATENT NO. : 5,227,062
DATED : July 13, 1993
INVENTOR(S) : Douglas L. Olsen

It is certified that error appears in the above-indentified patent and that said Letters Patent is hereby corrected as shown below:

Column 8, line 64, add "of the fluid separation system an after --sections--.

Column 10, line 55, add "flow" after --said--.

Signed and Sealed this

Twenty-first Day of June, 1994

Attest:

BRUCE LEHMAN

Attesting Officer   Commissioner of Patents and Trademarks